United States Patent
Peng (10) Patent No.: US 11,709,958 B2
(45) Date of Patent: Jul. 25, 2023

(54) SYSTEMS AND METHODS FOR CONTROLLING DATA ACCESS IN CLIENT-SIDE ENCRYPTION

(71) Applicant: Google LLC, Mountain View, CA (US)

(72) Inventor: Wei Hua Peng, San Francisco, CA (US)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 17/320,880

(22) Filed: May 14, 2021

(65) Prior Publication Data

US 2022/0343008 A1 Oct. 27, 2022

Related U.S. Application Data

(60) Provisional application No. 63/179,765, filed on Apr. 26, 2021.

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC ........................... G06F 21/6218; G06F 21/602
See application file for complete search history.

(56) References Cited

U.S. PATENT DOCUMENTS

| | | | | |
|---|---|---|---|---|
| 8,837,739 B1* | 9/2014 | Sexton | .................. | H04L 9/0825 380/278 |
| 9,197,419 B1* | 11/2015 | Chandrasekhar | ..... | G06F 21/604 |
| 9,497,563 B2* | 11/2016 | Hornung | ................ | H04W 4/50 |
| 9,602,473 B2* | 3/2017 | Robertson | ........... | H04L 63/0428 |
| 9,887,836 B1* | 2/2018 | Roth | ........................ | H04L 9/088 |
| 11,165,753 B1* | 11/2021 | Kawale | ................... | G06F 9/546 |
| 11,301,219 B2* | 4/2022 | DeTella | ................ | G06F 40/174 |
| 2003/0217259 A1* | 11/2003 | Wong | .................. | H04L 63/0442 713/153 |

(Continued)

OTHER PUBLICATIONS

The Extended European Search Report for European Patent Application No. 22165953.5, dated Aug. 30, 2022.

(Continued)

*Primary Examiner* — Gary S Gracia
(74) *Attorney, Agent, or Firm* — Botos Churchill IP Law (57) ABSTRACT

Systems and methods for controlling access to data in applications using client-side encryption. In that regard, in some examples, a first application (e.g., an email application, calendar application, messaging application, word processing application, file storage application, etc.) hosted from a particular web domain may be configured to invoke a second application hosted from a different origin (e.g., a different web domain or subdomain) to handle receiving and encrypting any sensitive information from a client entered through a client application (e.g., a web browser), and to handle decrypting information to be provided to the client through the client application. This second application may be loaded in an inline frame or similar subwindow or subroutine configured to prevent or limit the first application from having access to sensitive information in the second application.

20 Claims, 8 Drawing Sheets

(56) References Cited

U.S. PATENT DOCUMENTS

| | | | |
|---|---|---|---|
| 2007/0174636 A1* | 7/2007 | Raja | H04L 63/0442 380/278 |
| 2008/0256355 A1* | 10/2008 | Takemoto | H04L 63/0428 713/153 |
| 2009/0158035 A1* | 6/2009 | Stultz | H04L 63/0442 713/160 |
| 2009/0214034 A1* | 8/2009 | Mehrotra | G06Q 10/107 380/255 |
| 2014/0173272 A1* | 6/2014 | Kim | G06F 21/60 713/153 |
| 2015/0278550 A1* | 10/2015 | Lin | H04L 63/04 713/153 |
| 2016/0308840 A1* | 10/2016 | Munshi | H04L 51/066 |
| 2017/0104768 A1* | 4/2017 | Semenko | G06F 21/6218 |
| 2018/0083773 A1* | 3/2018 | Park | G06F 21/606 |
| 2019/0018931 A1* | 1/2019 | Chamney | G16H 40/67 |
| 2019/0044704 A1* | 2/2019 | Coleridge | H04L 9/0869 |
| 2019/0354695 A1* | 11/2019 | Agarwal | H04W 12/02 |
| 2020/0099667 A1* | 3/2020 | Parthasarathy | H04L 9/3213 |
| 2020/0193042 A1* | 6/2020 | Johns | H04L 9/0891 |
| 2020/0366656 A1* | 11/2020 | Barnett | H04L 9/3213 |
| 2021/0226934 A1* | 7/2021 | Barnett | H04L 63/0428 |
| 2021/0385217 A1* | 12/2021 | Benko | H04L 63/083 |
| 2022/0300637 A1* | 9/2022 | Claeys | G06F 21/6227 |
| 2022/0343008 A1* | 10/2022 | Peng | G06F 21/6218 |
| 2023/0066033 A1* | 3/2023 | Moore | H04L 63/0823 |

OTHER PUBLICATIONS

The Extended European Search Report for European Patent Application No. 22165962.6, dated Aug. 31, 2022.

* cited by examiner

Parent Application (mail.website.com)

| Compose |
|---|
| Inbox |
| Sent |
| Trash |

204

206

| New Message | Encryption | OFF |
|---|---|---|
| To: recipient@website.com<br>cc:<br>bcc:<br>Subject: Hey | | |
| Hey there. How are you doing? | | |

Parent Application (mail.website.com)

| Compose |
|---|
| Inbox |
| Sent |
| Trash |

208    204    206 iframe (cse-mail.website.com)

| New Message | Encryption | ON |
|---|---|---|
| To: recipient@website.com<br>cc:<br>bcc:<br>Subject: Hey | | |
| Hey there. How are you doing? | | |

702 — In response to receiving encrypted first data at a first application, configure a second application such that the second application can decrypt the first data into second data without the first application having access to the second data 704 — Receive the first data at the second application 706 — Decrypt the first data using the second application to generate the second data 708 — Using the second application, provide the second data to a client application

SYSTEMS AND METHODS FOR CONTROLLING DATA ACCESS IN CLIENT-SIDE ENCRYPTION

CROSS-REFERENCE TO RELATED APPLICATIONS

This application claims the benefit of the filing date of U.S. Provisional Application No. 63/179,765, filed Apr. 26, 2021, the disclosure of which is hereby incorporated by reference herein.

BACKGROUND

Many online applications allow or require that data entered by a client or displayed to a client be encrypted. However, those same applications may also interface with scripts or components that do not have a need for any of that encrypted data. In some cases where encrypted content is displayed in a web page, such other scripts may be hosted from the same origin as the parent application, and thus may be able to access the document object model ("DOM") of the page, which in turn gives the scripts access to all of the content on the parent application. For example, an online mail application at mail.website.com may be configured to handle encrypted emails and attachments, but may also be configured to interface with a different widget hosted from the same origin (mail.website.com) that provides additional features such as the ability to schedule emails to be sent at a later time.

BRIEF SUMMARY

The present technology concerns systems and methods for controlling access to data in applications using client-side encryption. In that regard, a first application (e.g., an email application, calendar application, messaging application, word processing application, file storage application, etc.) hosted from a particular web domain may be configured to invoke a second application hosted from a different origin (e.g., a different web domain or subdomain) to handle receiving and encrypting any sensitive information from a client entered through a client application (e.g., a web browser), and to handle decrypting information to be provided to the client through the client application. This second application may be loaded in an inline frame or similar subwindow or subroutine. In some aspects, by hosting the second application from a different origin than the first application, the first application and its scripts can be prevented from having access to the information in the second application (e.g., in some cases, the first application will not have access to the second application's DOM), and thus will not be able to access any sensitive information in its unencrypted form. In this way, the second application can act as a sandboxed intermediary between the client application and the first application.

In one aspect, the disclosure describes a computer-implemented method comprising, in response to a request to a first application to encrypt first data from a client application: configuring, using one or more processors of a processing system, a second application such that the second application can store the first data without the first application having access to the first data as stored by the second application; encrypting, using the one or more processors according to the second application, the first data into second data; and transmitting the second data from the second application to the first application. In some aspects, the first data comprises text, one or more files, or both the text and the one or more files. In some aspects, the first application is an email application, calendar application, messaging application, or file storage application. In some aspects, the first application comprises a webpage. In some aspects, the second application comprises an inline frame within the webpage. In some aspects, the second application further comprises an encrypter configured to encrypt the first data into the second data. In some aspects, the webpage is from a first origin and the inline frame is from a second origin. In some aspects, the first origin and the second origin represent different web domains. In some aspects, the first origin and the second origin represent different web subdomains of a common web domain. In some aspects, the client application comprises a web browser.

In another aspect, the disclosure describes a computer-implemented method comprising, in response to receiving encrypted first data at a first application: configuring, using one or more processors of a processing system, a second application such that the second application can decrypt the first data into second data without the first application having access to the second data; decrypting, using the one or more processors according to the second application, the first data to generate the second data; and using the second application, provide the second data to a client application. In some aspects, the first data comprises text, one or more files, or both the text and the one or more files. In some aspects, the first application is an email application, calendar application, messaging application, or file storage application. In some aspects, the first application comprises a webpage. In some aspects, the second application comprises an inline frame within the webpage. In some aspects, the second application further comprises a decrypter configured to decrypt the first data to generate the second data. In some aspects, the webpage is from a first origin and the inline frame is from a second origin. In some aspects, the first origin and the second origin represent different web domains. In some aspects, the first origin and the second origin represent different web subdomains of a common web domain. In some aspects, the client application comprises a web browser.

DETAILED DESCRIPTION

The present technology will now be described with respect to the following exemplary systems and methods.

Example Systems

Figure 1:
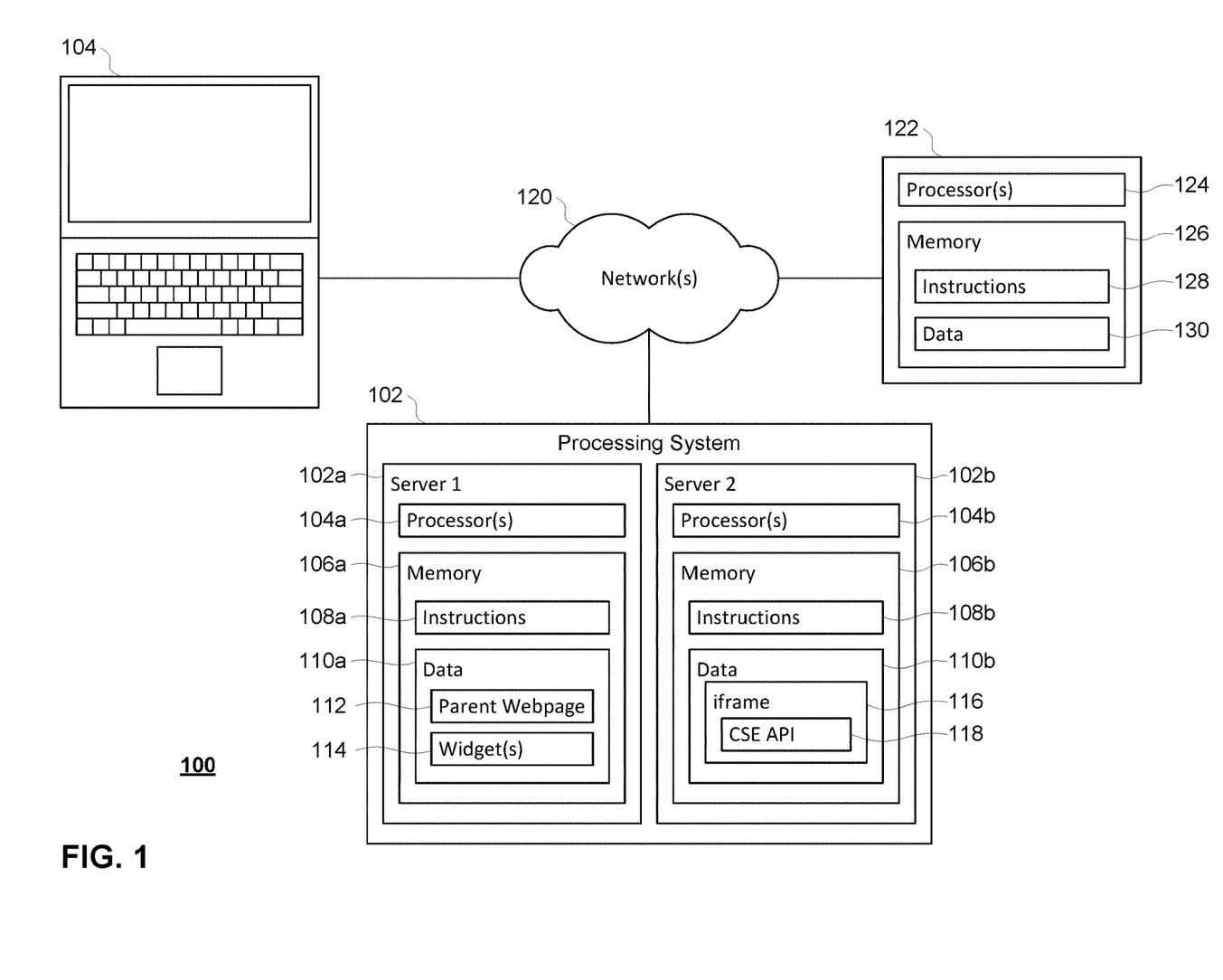
FIG. 1 is a functional diagram of an example system in accordance with aspects of the disclosure.

FIG. 1 schematically illustrates an arrangement 100 with an exemplary processing system 102 for performing the methods described herein. In the example of FIG. 1, the processing system 102 comprises two servers 102a and 102b, each of which include one or more processors 104a, 104b, and memory 106a, 106b storing instructions 108a, 108b and data 110a, 110b. In the first server, data 110a includes a parent webpage 112, and one or more widgets 114. In the second server, data 110b includes an inline frame or "iframe" 116, which in turn includes a client-side encryption API 118 ("CSE API"). In this regard, iframe 116 represents content which may be embedded in another webpage using an inline frame element. For example, the HTML of parent webpage 112 may include an inline frame element that causes the content of iframe 116 to be embedded inside an inline frame of webpage 112 when loaded by a client's web browser.

Processing system 102 may be resident on a single computing device, in which case servers 102a and 102b may be software servers resident on a single computing device. Likewise, processing system 102 may be resident on a server farm, cloud computing system, or other distributed system, in which case server 102a and 102b may be distributed across two or more different physical computing devices.

In the example of FIG. 1, processing system 102 is in communication with one or more networks 120, through which it can communicate with a client computing device 104, and an additional processing system 122. Client computing device 104 may be any type of computing device such as a desktop, laptop, smart phone, tablet, etc. As explained further below, client computing device 104 may be configured to run a client application (e.g., a web browser). The client computing device 104 may be further configured to load a first application (e.g., an email application, calendar application, messaging application, word processing application, file storage application, etc.) from parent webpage 112 hosted by server 102a, as well as a second application (e.g., for receiving and encrypting any sensitive information from a client entered through the client application, decrypting information to be provided to the client application through the client application, etc.) from iframe 116 hosted by server 102b.

Additional processing system 122 may be another server or collection thereof, such as a third-party website with which the one or more widgets 114 communicate, a destination server to which the parent webpage 112 is sending a message, a cloud storage system or database, etc. Like processing system 102, processing system 122 also has one or more processors 124 and memory 126 storing instructions 128 and data 130.

Processing system 102 may be implemented on any type of computing device(s), such as any type of general computing device, server, or set thereof, and may further include other components typically present in general purpose computing devices or servers. Memory 106a and 106b stores information accessible by the one or more processors 104a and 104b, including instructions and data that may be executed or otherwise used by the processor(s) 104a and 104b. Memory 106a and 106b may be of any non-transitory type capable of storing information accessible by the processor(s) 104a and 104b. For instance, memory 106a and 106b may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA, PYTHON, or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

In addition to the systems described above and illustrated in the figures, various operations will now be described.

Figure 2A:
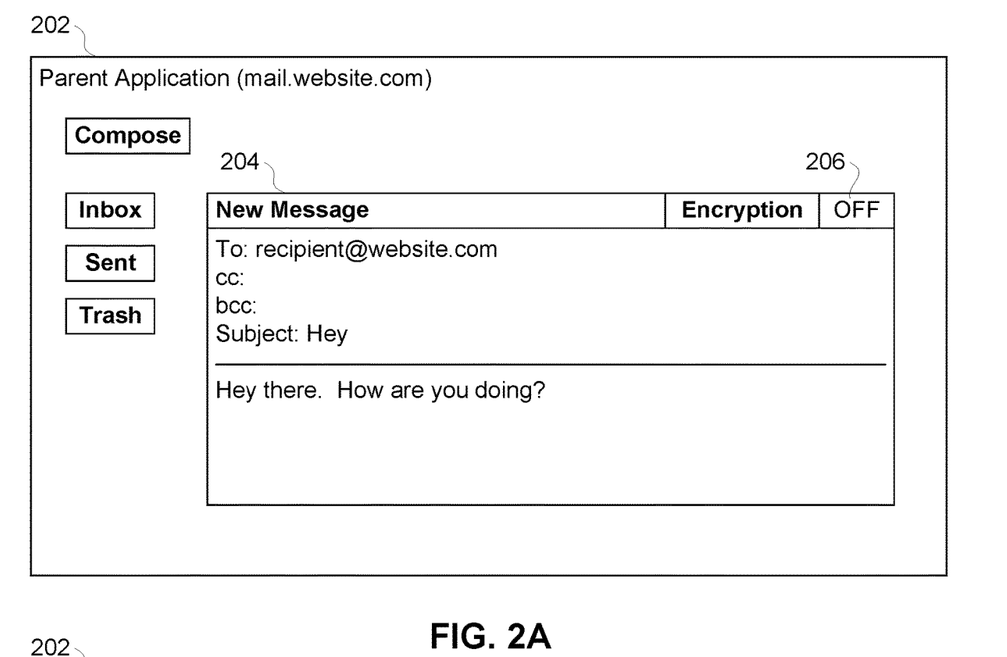
FIG. 2A shows an exemplary parent application window, in accordance with aspects of the disclosure.

FIG. 2A shows an exemplary parent application window 202 in which the parent application is an email application, in accordance with aspects of the disclosure. More specifically, FIG. 2A shows an example of how the parent application window 202 may appear on a client's web browser while the client is composing a message with encryption turned off. In that regard, the composition window 204 shows an example message addressed to recipient@website.com, with a subject of "Hey," and message text of "Hey there. How are you doing?" In addition, at the top right of composition window 204, there is an encryption status indicator 206 showing that encryption is off in this example. In the example of FIG. 2A, the composition window 204 and its associated text are hosted from the same origin (mail.website.com) as the parent window 202.

Figure 2B:
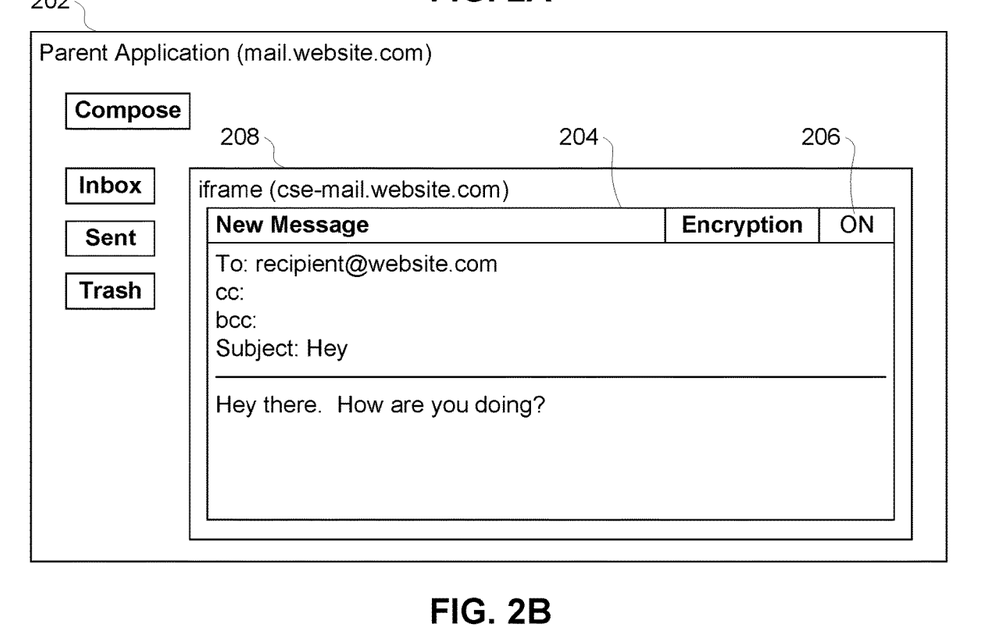
FIG. 2B shows an exemplary parent application window with an inline frame, in accordance with aspects of the disclosure.

FIG. 2B shows the same parent application window 202 as FIG. 2A, but shows an example of how the parent application window 202 may appear while the client is composing a message with encryption turned on, in accordance with aspects of the disclosure. In that regard, the composition window 204 is displayed from within an inline frame 208 hosted from a different origin of cse-mail.website.com. Although for clarity of illustration, the example of FIG. 2B shows the iframe 208 as having a visible boundary, it may be invisible such that the composition window 204 of FIG. 2B appears to be the same size and shape as the composition window 204 of FIG. 2A. Further, although this example assumes that iframe 208 will be hosted from a subdomain of example.com (cse-mail.website.com), in some aspects of the technology, it may be hosted from a completely different domain (e.g., iframe 208 could be served from an address having a completely different root domain). Here again, FIG. 2B shows an example message addressed to recipient@website.com, with a subject of "Hey," and message text of "Hey there. How are you doing?" However, at the top right of composition window 204, the encryption status indicator 206 shows that encryption is turned on in this example. In some aspects of the technology, there may be no visible indicator to show that encryption has been turned on or off. Likewise, the encryption indicator 206 may be included in a portion of the parent application window 202 outside of composition window 204 and/or iframe 208.

Figure 3:
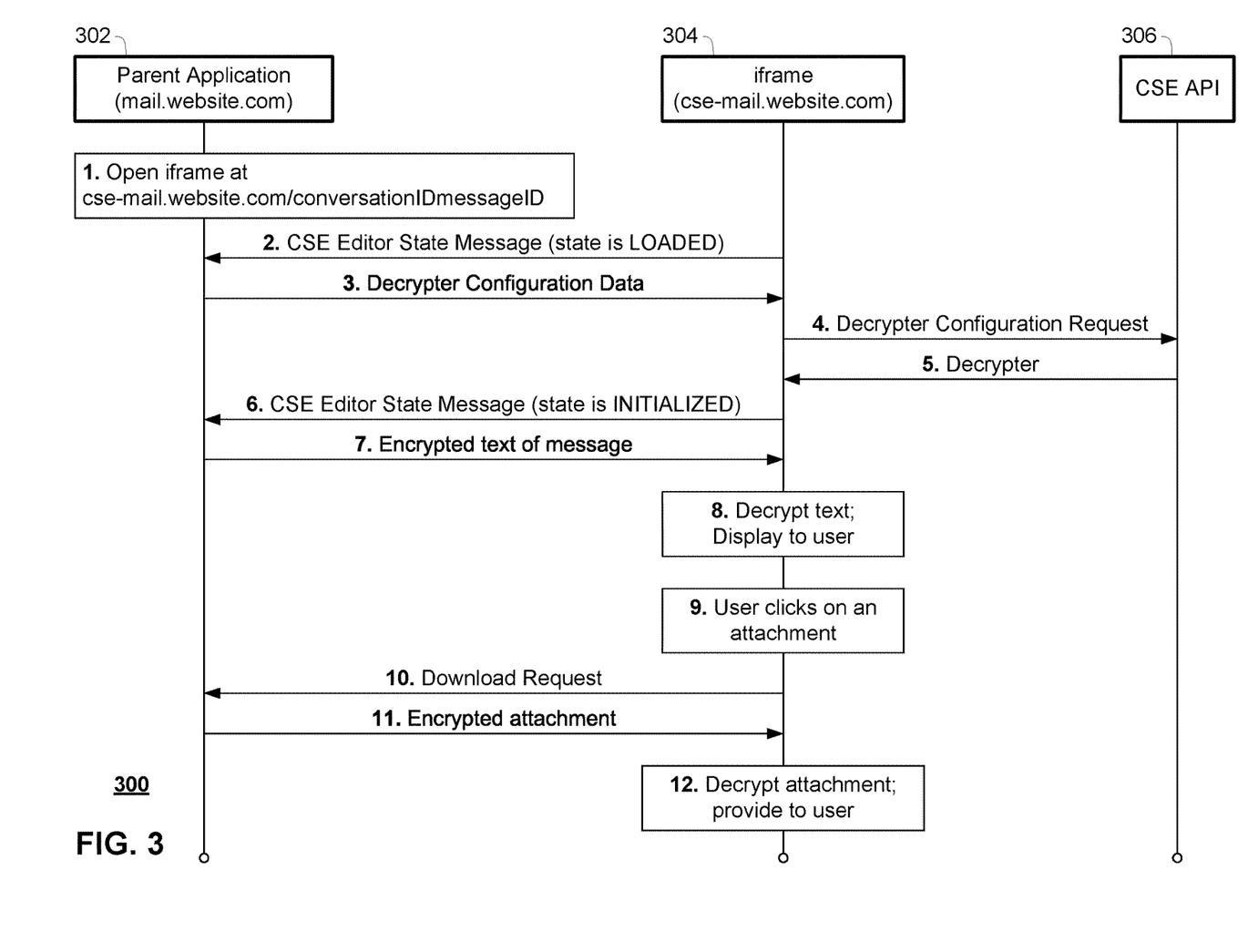
FIG. 3 shows a flow diagram of an exemplary process for handling the decryption and display of an encrypted message and attachment, in accordance with aspects of the disclosure.

FIG. 3 shows a flow diagram of an exemplary process 300 for handling the decryption and display of an encrypted message and attachment, in accordance with aspects of the disclosure. In that regard, FIG. 3 shows how data flows between a parent application 302, an iframe 304, and a client-side encryption API ("CSE API") 306. Here again, parent application 302 is hosted from mail.website.com, and the iframe 304 is hosted from a different origin of cse-mail.website.com. CSE API 306 may be hosted from cse-mail.website.com, or another location with which cse-mail.website.com is in communication. In order to provide client-side encryption, iframe 304 and CSE API 306 will be running locally on a client device (e.g., client computing device 104), and may be running on the client device within a further client application such as a web browser. Parent application 302 may also be running locally on the client device, and may likewise be running within a client application such as a web browser. However, in some aspects of the technology, parent application 302 may be running on a remote computing system (e.g., server 102a), such that the operations of parent application 302 shown in FIG. 3 are performed on the remote computing system.

Each action shown in the example of FIG. 3 will be described with respect to its associated bold-faced number. Thus, as shown in step 1, exemplary process 300 begins with the parent application 302 opening an iframe for an encrypted message that a user has selected for display. In this case, it is assumed that the parent application 302 is an email application. It is further assumed that the parent application 302 will open the iframe 304 at a location specific to the message to be decrypted, and the conversation to which it belongs. As a result, the parent application 302 is shown opening the iframe 304 at cse-mail.website.com/ conversationIDmessageID, where "conversationID" and "messageID" may be any suitable format for identifying the particular conversation and message.

In step 2 of FIG. 3, once the iframe 304 is finished loading, it indicates this to the parent application 302. In this example, it is assumed that the iframe 304 does this by sending a CSE Editor State Message indicating the state of the CSE Editor as "LOADED." However, any suitable type and format of message may be used.

In step 3 of FIG. 3, the parent application 302 sends iframe 304 data for setting up a decrypter. This decrypter configuration data may be in any suitable format for identifying how to decrypt the content of the encrypted message. In some aspects of the technology, the decrypter configuration data may be a single file (e.g., "DecrypterConfig") that identifies the type and version of encryption algorithm to use, and the encryption key or an encryption key reference.

In step 4 of FIG. 3, the iframe 304 sends a request to CSE API 306 requesting that a decrypter be created. This request will include or be based on the decrypter configuration data that was provided in step 3.

In step 5 of FIG. 3, the CSE API 306 will create the decrypter and pass it to iframe 304. In some aspects of the technology, the CSE API 306 will use an encryption key reference to get an encryption key from a key service (which may be local or external). The encryption key will then be passed to a function to create the decrypter. This decrypter may be passed to iframe 304 in any suitable way, such as by the CSE API 306 passing executable code to iframe 304, by CSE API 306 loading the decrypter into memory and providing an identifier (e.g., a filename, function name, script element, etc.) of that program to iframe 304, etc.

In step 6 of FIG. 3, once the decrypter has been initialized and is ready to accept encrypted content, the iframe 304 indicates this to the parent application 302. In this example, it is assumed that the iframe 304 does this by sending another CSE Editor State Message indicating the state of the CSE Editor as "INITIALIZED." However, any suitable type and format of message may be used.

In step 7 of FIG. 3, the parent application 302 sends the encrypted text of the message to the iframe 304. In step 8 of FIG. 3, the iframe 304 then decrypts this text using the decrypter, and displays it to the user. In that regard, the iframe 304 may display the decrypted text to the user by providing the decrypted text in a format such that it can be displayed to the user by a client application (e.g., as HTML content to be displayed on the user's web browser). Similar to the example of FIG. 2B, the boundaries of the iframe 304 may be invisible, resulting in this decrypted text appearing to be displayed within a portion of the window belonging to the parent application 302.

In step 9 of FIG. 3, the user clicks on a link within iframe 304 which represents an attachment. Here as well, the user may interact with this link through a client application such as a web browser. In the example of FIG. 3, it is assumed that this link was included within the encrypted text of the message which the parent application 302 sent to the iframe 304 in step 7. However, in some aspects of the technology, the parent application 302 may be configured to identify attachments to a message separately from sending the encrypted message text.

In step 10 of FIG. 3, once the attachment link has been clicked (or otherwise selected), the iframe 304 sends a download request to the parent application 302. This download request may take any suitable format. For example, in some aspects of the technology, the download request may be a simple message identifying an attachment ID of the file to be downloaded.

In step 11 of FIG. 3, the parent application 302 downloads the encrypted attachment, and passes it to the iframe 304. This may be done in any suitable way. For example, in some aspects of the technology, the parent application 302 may load the encrypted attachment into memory and provide the iframe 304 with the filename and directory of the encrypted attachment. In some aspects of the technology, the parent application 302 may send the content of the encrypted attachment directly to the iframe 304, either as a file or object (e.g., an ArrayBuffer reference).

In step 12 of FIG. 3, the iframe 304 will decrypt the attachment using the decrypter, and provide it to the user (e.g., by providing it to a client application such as a web browser). In that regard, the iframe 304 may be configured to automatically prompt the user to select a download location to which the attachment will be saved. However, in some aspects of the technology, the iframe 304 may also be configured to display the decrypted attachment to the user within the iframe. For example, where the attachment is a document with readable text, the text of the document may be displayed within a viewer inside of the iframe 304. Likewise, where the attachment is photograph, audio file, or video file, the iframe 304 may be configured to display or play the file within the iframe 304.

Figure 4A:
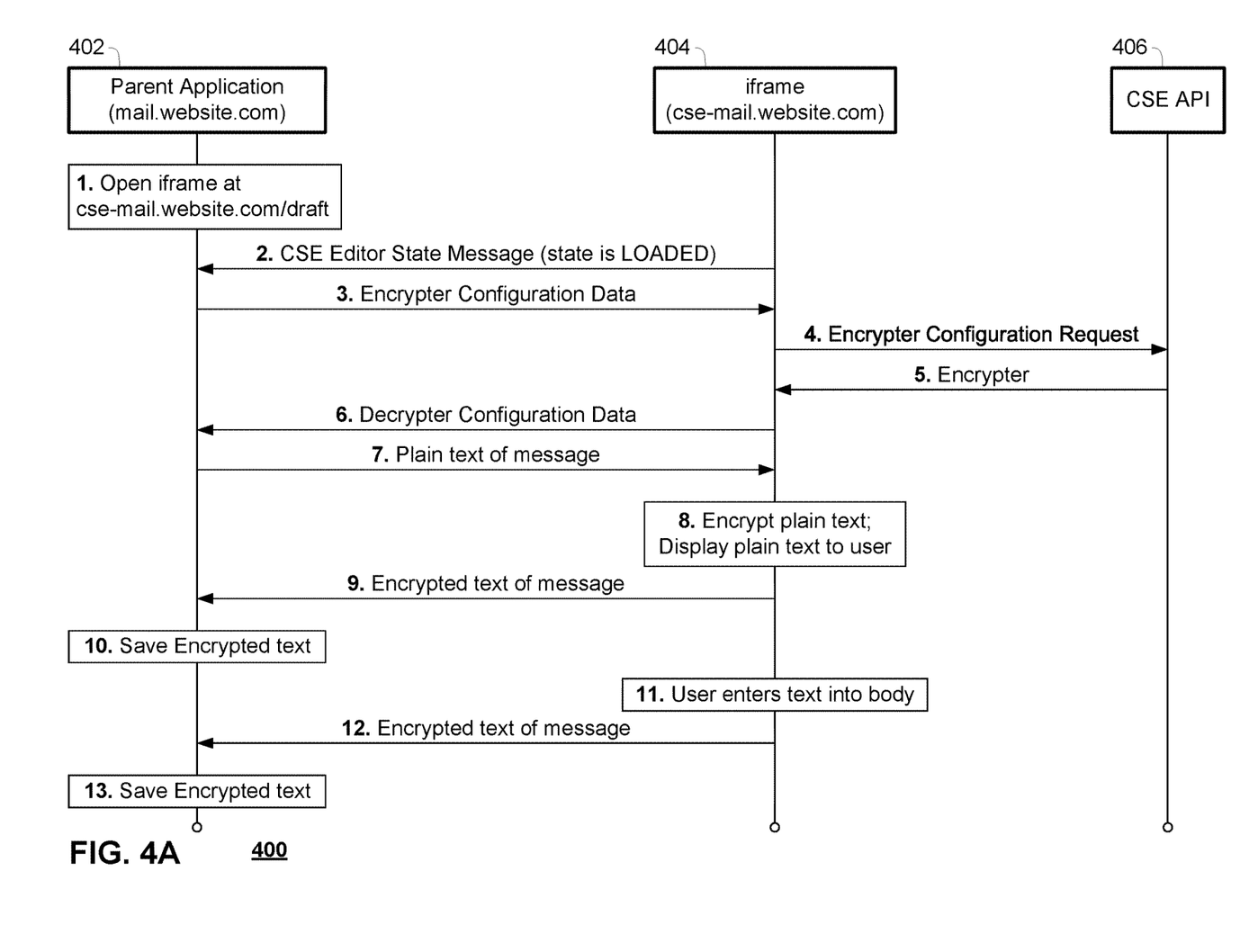
FIGS. 4A and 4B show a flow diagram of an exemplary process for handling the encryption, display, and saving of a new message and attachment, in accordance with aspects of the disclosure.
Figure 4B:
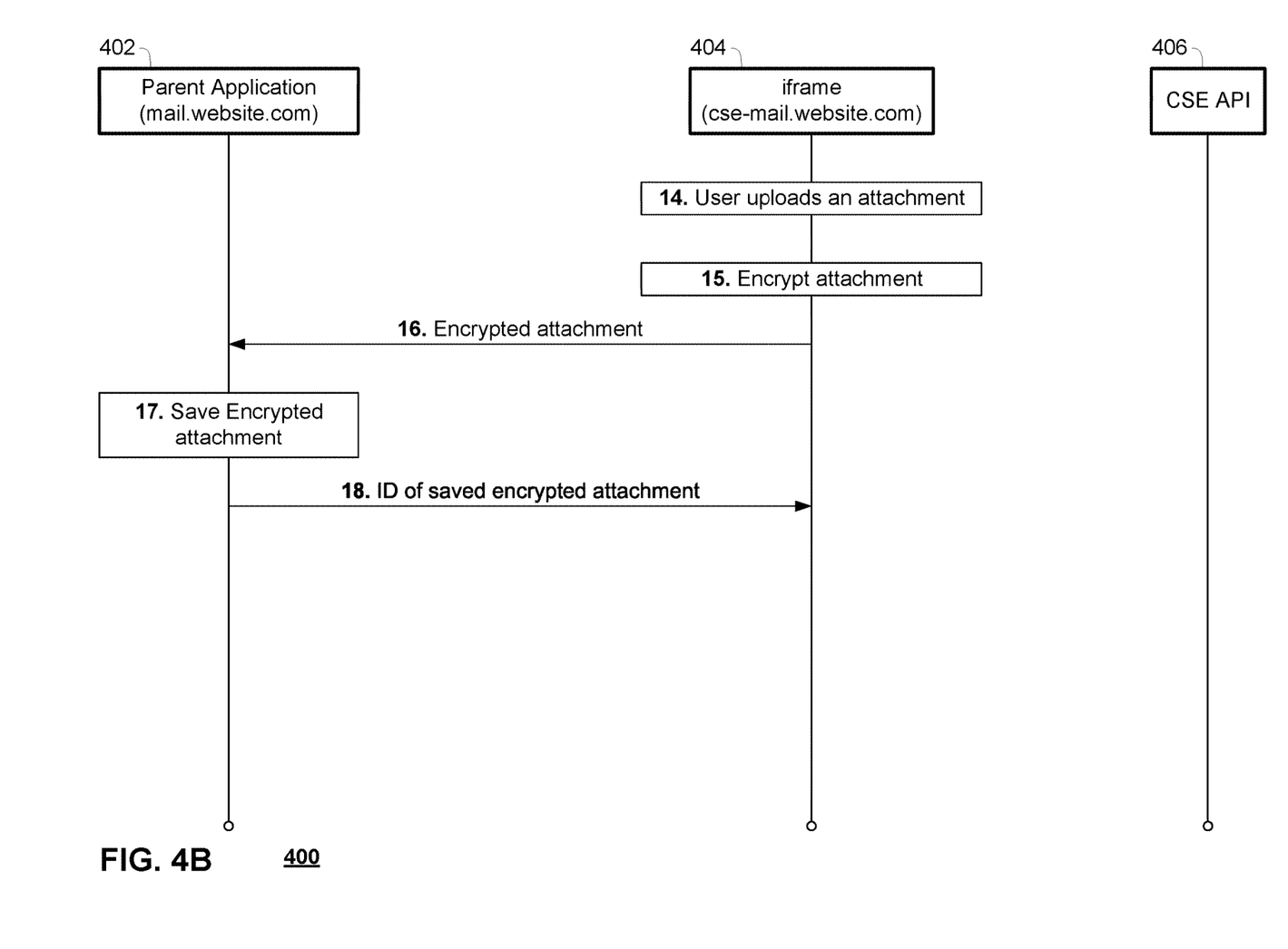

FIGS. 4A and 4B show a flow diagram of an exemplary process 400 for handling the encryption, display, and saving of a new message and attachment, in accordance with aspects of the disclosure. As with FIG. 3, the flow diagrams of FIGS. 4A and 4B show how data flows between a parent application 402, an iframe 404, and a CSE API 406. Here as well, parent application 402 is hosted from mail.website-.com, the iframe 404 is hosted from a different origin of cse-mail.website.com, and CSE API 406 may be hosted from cse-mail.website.com, or another location with which cse-mail.website.com is in communication. Likewise, in order to provide client-side encryption, iframe 404 and CSE API 406 will be running locally on a client device (e.g., client computing device 104), and may be running on the client device within a further client application such as a web browser. Here again, parent application 402 may be running locally on the client device (including within a client application such as a web browser), or may be running on a remote computing system (e.g., server 102a), such that the operations of parent application 402 shown in FIGS. 4A and 4B are performed on the remote computing system. As with FIG. 3, each action in FIGS. 4A and 4B will be described with respect to its associated bold-faced number.

As shown in step 1 of FIG. 4A, exemplary process 400 begins with the parent application 402 opening an iframe for receiving and encrypting text input by a user. Here again, it is assumed that the parent application 402 is an email application. It is further assumed that the parent application 402 will open the iframe 404 at a location specific to the draft message being composed. As a result, the parent application 402 is shown opening the iframe 404 at cse-mail.website.com/draft, where "draft" may be any suitable format for identifying the particular draft.

In step 2 of FIG. 4A, once the iframe 404 is finished loading, it indicates this to the parent application 402. In this example, it is assumed that the iframe 404 does this by sending a CSE Editor State Message indicating the state of the CSE Editor as "LOADED." However, any suitable type and format of message may be used.

In step 3 of FIG. 4A, the parent application 402 sends iframe 404 data for setting up an encrypter. This encrypter configuration data may be in any suitable format for identifying how to encrypt the content of the message being composed (and any files that may be attached). In some aspects of the technology, the encrypter configuration data may be a single file (e.g., "EncrypterConfig") that identifies the type and version of encryption algorithm to use, and the encryption key. Although the example of FIG. 4A assumes that the parent application 402 will specify the encrypter configuration, in some aspects of the technology, the iframe 404 may instead be configured to specify the type and version of encryption algorithm to use, and the encryption key to be used. In such a case, the iframe 404 may then communicate the chosen encrypter configuration data to the parent application 402.

In step 4 of FIG. 4A, the iframe 404 sends a request to CSE API 406 requesting that an encrypter be created. This request will include or be based on the encrypter configuration data that was provided in step 3.

In step 5 of FIG. 4A, the CSE API 406 will create the encrypter and pass it to iframe 404. This may be done in any suitable way, such as by the CSE API 406 passing executable code to iframe 404, by CSE API 406 loading the encrypter into memory and providing an identifier (e.g., a filename, function, script element, etc.) of that program to iframe 404, etc.

In step 6 of FIG. 4A, once the encrypter has been initialized and is ready to accept content to be encrypted, the iframe 404 indicates this to the parent application 402. In this example, it is assumed that the iframe 404 does this by sending the parent application 402 data for setting up a decrypter. As above, this decrypter configuration data may be in any suitable format for identifying how to decrypt the content of encrypted messages. In some aspects of the technology, the decrypter configuration data may be a single file (e.g., "DecrypterConfig") that identifies the type and version of encryption algorithm to use, and the encryption key or an encryption key reference. However, in some aspects of the technology, decrypter configuration data may not be provided at this time. In that regard, any other suitable type and format of message may be used by the iframe 404 to indicate its readiness to accept content to be encrypted. For example, in some implementations, the iframe 404 may indicate its readiness by sending another CSE Editor State Message indicating the state of the CSE Editor as "INITIALIZED."

In step 7 of FIG. 4A, the parent application 402 sends the existing plain text content of the message to the iframe 404. If the user has not yet entered any text prior to selecting to compose in encrypted mode, this plain text may only include the default fields of the message (e.g., to, from, cc, bcc, subject, body) and/or related content (e.g., the template of the message, any associated html). In this example, it is assumed that the user has not uploaded any attachments prior to selecting to compose in encrypted mode. However, if the user uploads one or more attachments prior to selecting to compose in encrypted mode, the parent application may also transmit the attachment to the iframe 404 for encryption. In such a case, the iframe 404 and parent application 402 may be configured to process these initial attachments using the same flow described below with respect to steps 15-18.

In step 8 of FIG. 4A, the iframe 404 encrypts the plain text content (that which was received in step 7) using the encrypter. The iframe 404 also displays this plain text to the user. Here as well, the iframe 404 may display the plain text to the user by providing the plain text in a format such that it can be displayed to the user by a client application (e.g., as HTML content to be displayed on the user's web browser). Similar to the example of FIG. 2B, the boundaries of the iframe 404 may be invisible, resulting in this plain text appearing to be displayed within a portion of the window belonging to the parent application 402.

In steps 9 and 10 of FIG. 4A, the iframe 404 passes the encrypted text (created in step 8) back to the parent application 402, where it is saved. The same continues as the user enters further text into the body of the email (now hosted by iframe 404). Here as well, the user's inputs may be conveyed to the iframe 404 by a client application such as a web browser. Thus, as shown in steps 11-13, after the user enters further text into the body (step 11), the iframe 404 encrypts that newly entered text and sends it back to the parent application 402 (step 12), where it is saved (step 13). The iframe 404 may be configured to send encrypted text back to the parent application 402 in real-time or on any suitable interval (e.g., every second, every 15 seconds, every minute, etc.).

Maintaining an encrypted copy of the message in parent application 402 may be beneficial for a variety of reasons. For example, in some aspects of the technology, this may be done for backup purposes (e.g., parent application 402 may store the encrypted copy of the draft message in a drafts folder). Likewise, in some aspects of the technology, this may be done to allow widgets (e.g., widget(s) 114) that are not dependent upon the content of the message to continue to function even if they are hosted in the same origin as the parent application 402 and thus lack access to the DOM of the iframe 404. However, in some aspects of the technology, it may not be necessary to store an encrypted copy of the message in the parent application 402. In such a case, steps 9, 10, 12, and 13 may be omitted.

In step 14 of FIG. 4B, the user uploads an attachment to the message. As the steps of FIG. 4B follow those of FIG. 4A, this takes place in the encrypted drafting mode. As such, the attachment is uploaded directly to iframe 404.

In steps 15 and 16 of FIG. 4B, once the attachment is uploaded, the iframe 404 encrypts the attachment using the encrypter (step 15), and sends the resulting encrypted attachment to the parent application 402 (step 16).

In steps 17 and 18 of FIG. 4B, once the parent application 402 receives the encrypted attachment, it saves it (step 17) and sends an identifier for the encrypted attachment back to the iframe 404 (step 18). This identifier may be a message of any type or format suitable for identifying the attachment. In some aspects of the technology, the iframe 404 may not be configured to maintain a copy of the unencrypted attachment. In such a case, if the user requests to download or view a copy of the attachment (e.g., by a clicking a link to confirm that the right attachment was uploaded), the iframe 404 may use the attachment ID to obtain a copy of the encrypted attachment from the parent application, and may decrypt the attachment as described above with respect to steps 3-5 and 9-12 of FIG. 3.

Figure 5:
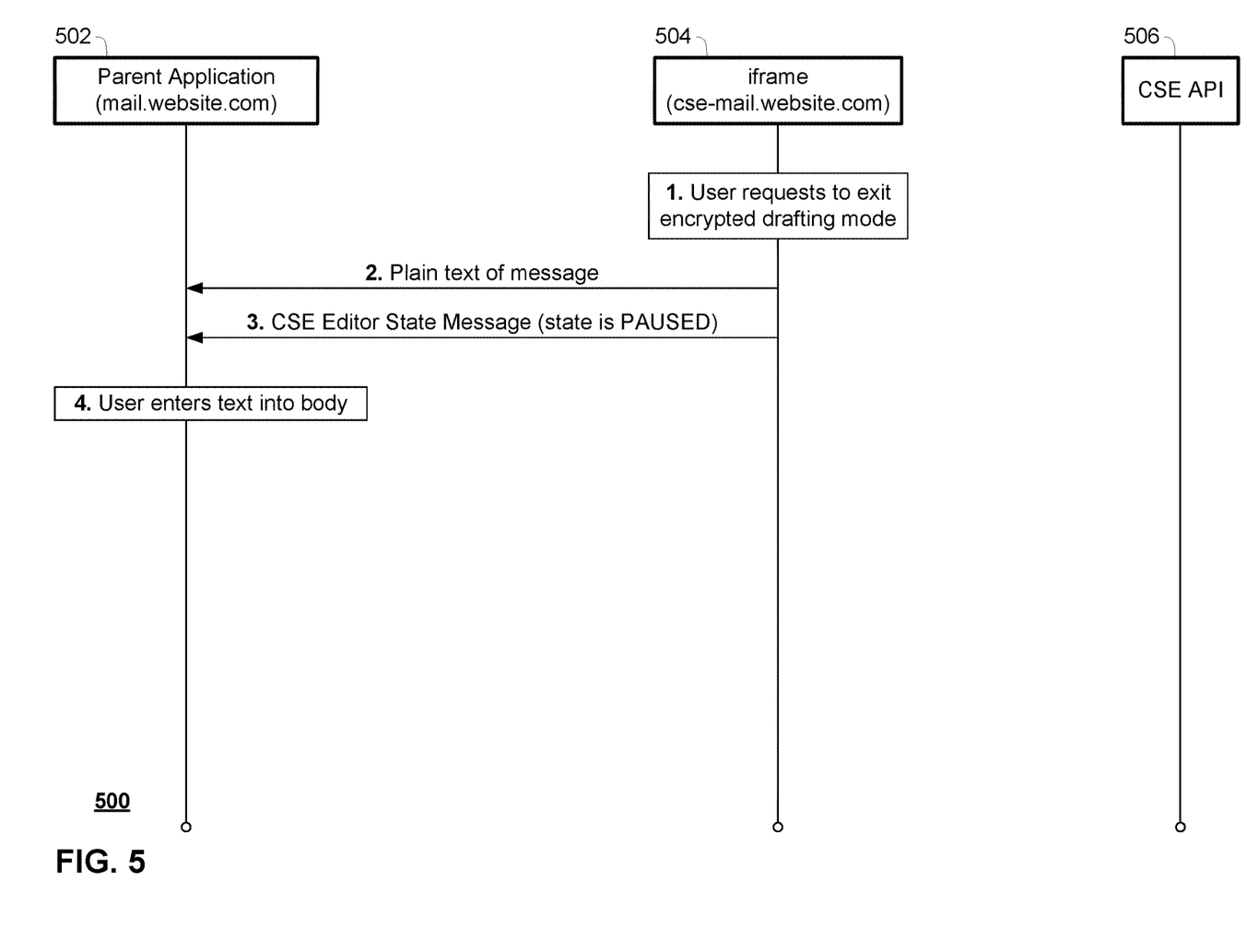
FIG. 5 shows a flow diagram of an exemplary process for transitioning from an encrypted drafting mode to an unencrypted drafting mode, in accordance with aspects of the disclosure.

FIG. 5 shows a flow diagram of an exemplary process 500 for transitioning from an encrypted drafting mode to an unencrypted drafting mode, in accordance with aspects of the disclosure. As such, the exemplary process 500 may be used to transition from the encrypted drafting mode represented in FIGS. 4A and 4B (following initialization steps 1-7) to an unencrypted drafting mode in which the user's inputs are received directly by the parent application 402 and are not unencrypted.

As with FIGS. 3, 4A, and 4B, the flow diagram of FIG. 5 shows how data flows between a parent application 502, an iframe 504, and a CSE API 506. Here again, it is assumed that the parent application 502 is an email application hosted from mail.website.com, that the iframe 504 is hosted from a different origin of cse-mail.website.com, and that the CSE API 506 may be hosted from cse-mail.website.com, or another location with which cse-mail.website.com is in communication. Likewise, it is assumed that iframe 504 and CSE API 506 will be running locally on a client device (e.g., client computing device 104), and may be running on the client device within a further client application such as a web browser. Here again, parent application 502 may be running locally on the client device (including within a client application such as a web browser), or may be running on a remote computing system (e.g., server 102a), such that the operations of parent application 502 shown in FIG. 5 are performed on the remote computing system. As with FIGS. 3, 4A, and 4B, each action in FIG. 5 will be described with respect to its associated bold-faced number.

As shown in step 1 of FIG. 5, exemplary process 500 begins with a user requesting to exit the encrypted drafting mode. This may be done in any suitable way, such as by clicking a button to turn off or deselect encryption. For example, in the context of the exemplary page layouts of FIGS. 2A and 2B, the user may click on (or otherwise select) an area of the interface associated with encryption indicator 206 to toggle it from "ON" (as shown in FIG. 2B) to "OFF" (as shown in FIG. 2A). As above, the user may submit this request using a client application such as a web browser.

In step 2 of FIG. 5, once the request to exit the encrypted drafting mode is received, the iframe 504 sends the unencrypted plain text of the message to the parent application so that composition can continue there in an unencrypted drafting mode.

In step 3 of FIG. 5, the iframe 504 indicates the user's request to enter unencrypted drafting mode to the parent application 502. In this example, it is assumed that the iframe 504 does this by sending a CSE Editor State Message indicating the state of the CSE Editor as "PAUSED." However, any suitable type and format of message may be used.

In step 4 of FIG. 5, the user continues entering text into the email body. As the encrypted drafting mode has been paused, this newly entered text is received directly by the parent application 502. Again, the user's text may be conveyed to the parent application 502 by a client application such as a web browser.

Although not reflected in the exemplary flow of FIG. 5, if the user later chooses to reenter encrypted drafting mode, the parent application 502 may transition control of the drafting over to the iframe 504 using the same process flow described above with respect to FIGS. 4A and 4B. In that regard, if the iframe 504 is configured to maintain the encrypter in memory after being paused (as described in step 3 of FIG. 5), then the parent application 502 may transition back to iframe 504 by simply sending the existing plaintext back to the iframe (as described in step 7 of FIG. 4A).

Figure 6:
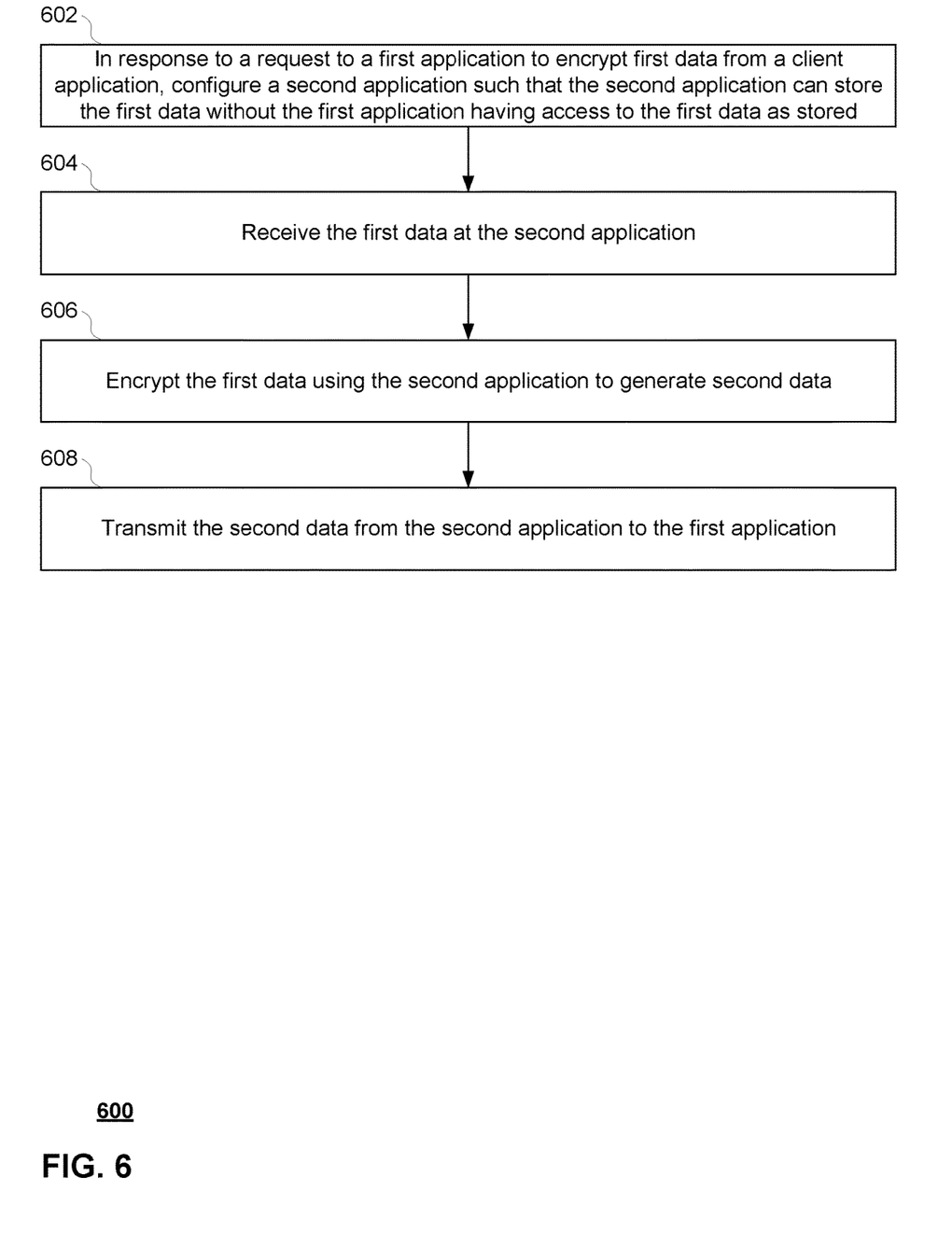
FIG. 6 shows a flow diagram of an exemplary process for using a second application to encrypt data from a client application and to provide the encrypted data to a first application, in accordance with aspects of the disclosure.

FIG. 6 shows a flow diagram of an exemplary process for using a second application to encrypt data from a client application and to provide the encrypted data to a first application, in accordance with aspects of the disclosure. The steps of method 600 may thus be performed by one or more processors of a processing system (e.g., client computing device 104 and/or processing system 102 of FIG. 1) in response to a request to a first application to encrypt first data transmitted (or to be transmitted) by a client application. Method 600 may be applied to any suitable context. For example, the first application may be an email application, calendar application, messaging application, word processing application, file storage application, or any other application in which encrypting content from a client application may be desired. In some aspects of the technology, the first application may comprise a webpage, and the client application may comprise a web browser. In some aspects of the technology, the first application, second application, and client application may all be running on the same computing device (e.g., a client device such as client computing device 104 of FIG. 1). In some aspects of the technology, the second application and client application may be running on a client computing device (e.g., client computing device 104 of FIG. 1), while the first application may be running on a remote computing device (e.g., server 102a of FIG. 1).

In that regard, in step 602, the processing system configures a second application such that the second application can store the first data without the first application having access to the first data as stored by the second application. As noted above, this may be done in any suitable way. For example, in some aspects of the technology, the first application may comprise a webpage, and the second application may comprise an iframe within the webpage. In some aspects, the iframe may further comprise an associated encrypter (e.g., a function or program configured to perform encryption). In some aspects, the webpage and the iframe may have different origins from one another, such as different web domains or subdomains such that the first application (and any scripts running thereon) do not have access to the DOM of the second application. In some aspects of the technology, the second application may comprise a subwindow or subroutine configured such that the first application does not have access to the first data once it is received by the second application.

In step 604, the first data is received at the second application. The second application may receive the first data directly from the client application, or through one or more intermediaries. In that regard, in some aspects of the technology, the first application may be configured to receive and forward the first data to the second application without accessing or retaining access to the first data.

In step 606, the second application encrypts the first data to generate second data. The second application may do this using any suitable encryption method. Further, as noted above, the second application may comprise an encrypter for encrypting the first data into second data, or may be configured to call a separate encrypter application to perform this task.

In step 608, the second application transmits the second data to the first application. As noted above, once received, the first application may be configured to store the second data, transmit it to another computing system, etc. For example, where the first application is an email or messaging application, the first application may be configured to maintain a backup copy of the second data (e.g., locally or at a remote server) while the email or message is being composed, and may be configured to transmit the second data to another computing system when the client application indicates that an email or message containing the second data is to be sent to a recipient. Likewise, where the first application is a calendar application, the first application may be configured to maintain a copy of the second data (e.g., locally or at a remote server) while a calendar entry is being created, may be configured to transmit the second data to another computing system when the client application indicates that a calendar invitation containing the second data is to be sent to a recipient, and may (e.g., after the calendar entry has been created) be configured to provide the second data back to the client application when requested (e.g., for decryption by the second application). Further, where the first application is a file storage application (e.g., a cloud storage application), the first application may be configured to store the second data, and to provide the second data back to the client application (or another authorized application) when subsequently requested (e.g., for decryption by the second application).

Figure 7:
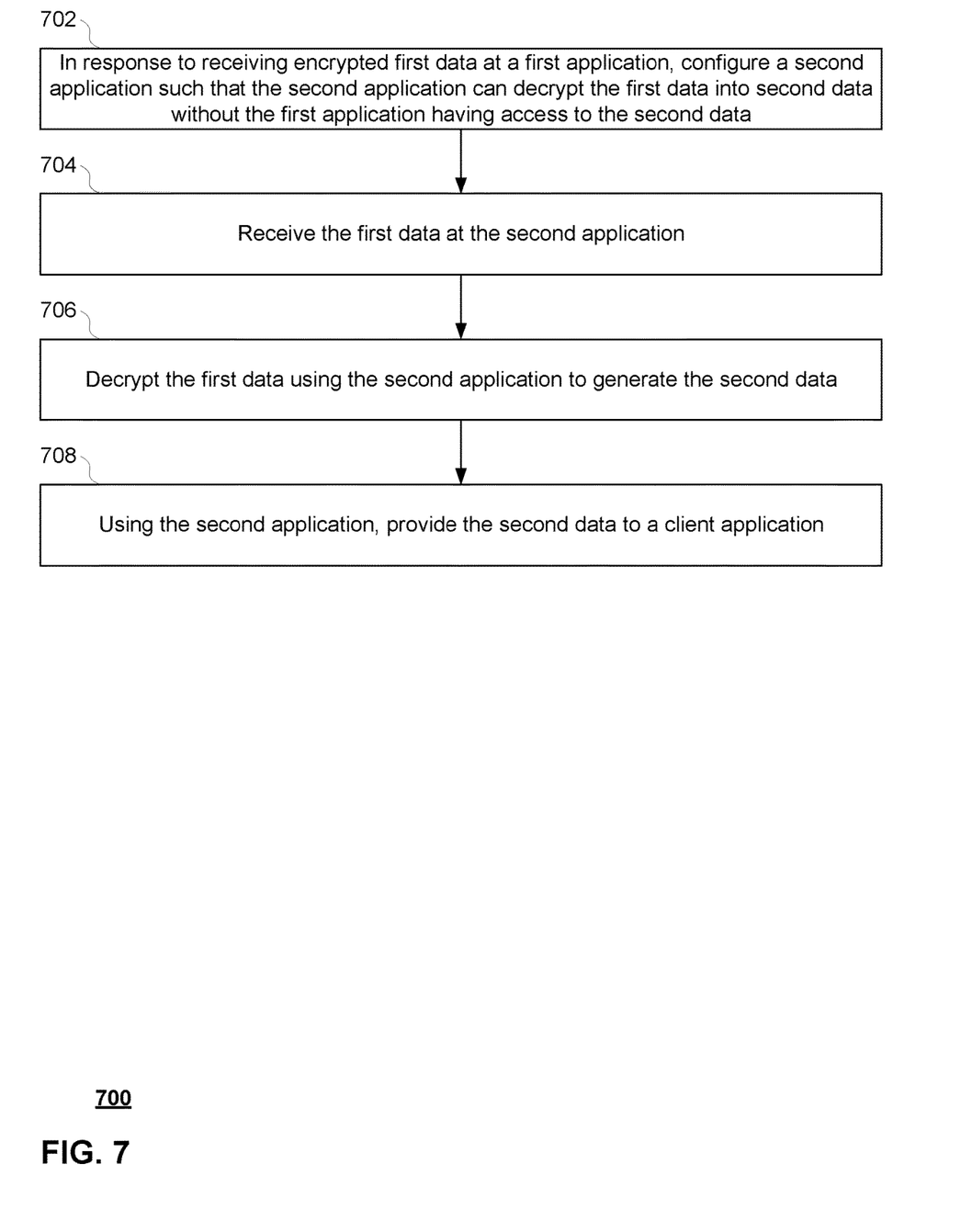
FIG. 7 shows a flow diagram of an exemplary process for using a second application to decrypt data received by a first application and to provide the decrypted data to a client application, in accordance with aspects of the disclosure.

FIG. 7 shows a flow diagram of an exemplary process for using a second application to decrypt data received by a first application and to provide the decrypted data to a client application, in accordance with aspects of the disclosure. The steps of method 700 may thus be performed by one or more processors of a processing system (e.g., client computing device 104 and/or processing system 102 of FIG. 1) in response to a first application receiving encrypted first data. Here as well, method 700 may be applied to any suitable context. For example, the first application may be an email application, calendar application, messaging application, word processing application, file storage application, or any other application in which decrypting content for use by a client application may be desired. In some aspects of the technology, the first application may comprise a webpage, and the client application may comprise a web browser. In some aspects of the technology, the first application, second application, and client application may all be running on the same processing system (e.g., a client device such as client computing device 104 of FIG. 1). In some aspects of the technology, the second application and client application may be running on a client computing device (e.g., client computing device 104 of FIG. 1), while the first application may be running on a remote computing device (e.g., server 102a of FIG. 1).

In that regard, in step 702, the processing system configures a second application such that the second application can decrypt the first data into second data without the first application having access to the second data. As noted above, this may be done in any suitable way. For example, in some aspects of the technology, the first application may comprise a webpage, and the second application may comprise an iframe within the webpage. In some aspects, the iframe may further comprise an associated decrypter (e.g., a function or program configured to perform decryption). In some aspects, the webpage and the iframe may have different origins from one another, such as different web domains or subdomains such that the first application (and any scripts running thereon) do not have access to the DOM of the second application. In some aspects of the technology, the second application may comprise a subwindow or subroutine configured such that the first application does not have access to the second data once it is generated by the second application.

In step 704, the first data is received at the second application. The second application may receive the first data from the first application or some other application.

In step 706, the second application decrypts the first data to generate the second data. The second application may comprise a decrypter for decrypting the first data into the second data, or may be configured to call a separate decrypter application to perform this task.

In step 708, the second application provides the second data to a client application. The second application may do this in any suitable way, such as by outputting the second data to a display or speaker associated with the processing system, by prompting the client application to download the second data, by providing the second data in a format such that it can be displayed to the user by a client application (e.g., as HTML content to be displayed on the user's web browser), etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method comprising:
   in response to a request to a first application to encrypt first data from a client application within a computing device:
      configuring, using one or more processors of the computing device, a second application comprising an iframe with a Docket Object Model (DOM), such that the second application can store the first data without the first application having access to the first data as stored by the second application, in which the first application does not have access to the DOM of the iframe;
      encrypting, using the one or more processors according to the second application, the first data into second data; and
      transmitting the second data from the second application to the first application.

2. The method of claim 1, wherein the first data comprises text, one or more files, or both the text and the one or more files.

3. The method of claim 1, wherein the first application is an email application, calendar application, messaging application, or file storage application.

4. The method of claim 1, wherein the first application comprises a webpage.

5. The method of claim 4, wherein the second application comprises an inline frame within the webpage.

6. The method of claim 5, wherein the second application further comprises an encrypter configured to encrypt the first data into the second data.

7. The method of claim 5, wherein the webpage is from a first origin and the inline frame is from a second origin.

8. The method of claim 7, wherein the first origin and the second origin represent different web domains.

9. The method of claim 7, wherein the first origin and the second origin represent different web subdomains of a common web domain.

10. The method of claim 5, wherein the client application comprises a web browser.

11. A computer-implemented method comprising:
    in response to receiving encrypted first data at a first application:
       configuring, using one or more processors of a computing device, a second application comprising an iframe with a Docket Object Model (DOM), such that the second application can decrypt the first data into second data without the first application having access to the second data, wherein the first application does not have access to the DOM of the iframe
       decrypting, using the one or more processors according to the second application, the first data to generate the second data; and
       using the second application, providing the second data to a client application at the computing device.

12. The method of claim 11, wherein the first data comprises text, one or more files, or both the text and the one or more files.

13. The method of claim 11, wherein the first application is an email application, calendar application, messaging application, or file storage application.

14. The method of claim 11, wherein the first application comprises a webpage.

15. The method of claim 14, wherein the second application comprises an inline frame within the webpage.

16. The method of claim 15, wherein the second application further comprises a decrypter configured to decrypt the first data to generate the second data.

17. The method of claim 15, wherein the webpage is from a first origin and the inline frame is from a second origin.

18. The method of claim 17, wherein the first origin and the second origin represent different web domains.

19. The method of claim 17, wherein the first origin and the second origin represent different web subdomains of a common web domain.

20. The method of claim 15, wherein the client application comprises a web browser.

* * * * *